UNITED STATES PATENT OFFICE.

HEINRICH ECKARDT, OF DORTMUND, PRUSSIA, GERMANY.

PROCESS OF MAKING ALLOYS OF CHROME, IRON, AND MANGANESE.

SPECIFICATION forming part of Letters Patent No. 399,023, dated March 5, 1889.

Application filed January 8, 1889. Serial No. 295,755. (No specimens.) Patented in Germany January 31, 1888, No. 44,896; in England September 24, 1888, No. 13,742, and in Belgium September 29, 1888, No. 62,155.

*To all whom it may concern:*

Be it known that I, HEINRICH ECKARDT, of Dortmund, in the Kingdom of Prussia and Empire of Germany, a citizen of the German Empire, have invented certain new and useful Improvements in Processes of Making Alloys of Chrome, Iron, and Manganese, (which was patented to me in Germany, No. 44,896, dated January 31, 1888; in Belgium, No. 62,155, dated September 29, 1888, and in Great Britain, No. 13,742, dated September 24, 1888,) of which the following is a specification.

This invention relates to an improved process of making alloys of chrome, iron, and manganese from a mixture of chrome and manganese ores with the slag of the acid Bessemer process.

It is well known that chrome ....parts excellent qualities to ingot iron and steel. The use of chrome, however, and the economical production of the chrome alloys is rendered impossible, owing to the difficulty encountered in the reduction of the chrome ores. I have discovered that the reduction of chrome ores can be produced in an easy and perfect m. ner by mixing the ores with a corresponding quantity of slag obtained in the acid Bessemer process, and then producing by reduction an alloy of chrome, which in the qualities imparted to the steel or ingot iron mixed therewith has many advantages over the chrome iron obtained directly from the chrome ores. The more intimately the ore and steel are mixed the more easily and perfectly is the reduction of the ore obtained. It can be carried out in the presence of carbon in a hearth or reverberatory furnace or in a blast-furnace, as desired.

A chrome ore which is composed of about fifty per cent. chrome oxide, $(Cr_2O_3)$ twelve per cent. of ferric oxide, $(Fe_2O_3,)$ eleven per cent. of aluminium oxide, $(Al_2O_3,)$ eighteen per cent. of magnesium oxide, (MgO,) and nine per cent. of silicium oxide $(S_2O_2)$ is mixed with Bessemer slag containing about forty-five per cent. of silicium oxide, $(SiO_2,)$ ten per cent. of ferrous oxide, (FeO,) forty-five per cent. of manganese oxide, (Mn O,) and the required quantity of carbon, and subjected to reduction by melting, and produce thereby a chrome alloy of about fifty per cent. chrome, (Cr,) twenty per cent. manganese, (Mn,) twenty per cent. iron, (Fe,) and a slag which contains about fifty per cent. of silicium oxide, $(SiO_2,)$ one-half per cent. of ferrous oxide, (FeO,) fourteen per cent. of aluminium oxide, $(Al_2O_3,)$ eighteen per cent. of manganese oxide, (MnO,) sixteen per cent. of magnesium oxide, (MgO,) and only traces of chrome oxide, $(Cr_2O_3.)$ The separation of the alloyed metal from the slag is therefore so accomplished in a very perfect manner, inasmuch as, first, the Bessemer slag employed forms an effective solvent for the almost insoluble earths of the chrome ores, and, secondly, as the quantity of manganese in the chrome alloy, which depends on the slag employed, imparts to the metal the property of melting easily. For securing the desired quantity of manganese in the alloy a proportionate quantity of manganese ores may be added to the mixture before reduction.

When it is desired to carry out my process of producing ferro-chrome manganese alloys in a blast or reverberatory furnace the following method has given very satisfactory practical results: The chrome ore and the acid Bessemer slag are ground to a fine powder, and are then mixed with tar containing no water, in such proportions that the quantity of tar added contains a sufficient quantity of carbon for the reduction of the ore. The pasty mass thus obtained is pressed into briquettes and ubjected in a blast or reverberatory furnace with coals or with charcoal in lumps to the reduction process. The alloys thus obtained are added in the proper proportion to ingot iron or steel in the usual manner.

The process described has the advantage that the slag of the acid Bessemer process, which heretofore has generally been dumped and gone to waste, notwithstanding the manganese contained in the same, can be utilized in an effective manner.

Having thus described my invention, I claim as new and desire to secure by Letters Patent—

1. The herein-described process of producing alloys of chrome, iron, and manganese, which consists in mixing chrome ore with the slag of the acid Bessemer process and subjecting the mixture to the reduction process, substantially as set forth.

2. The process herein described of producing alloys of chrome, iron, and manganese, which consists in mixing ores of chrome and manganese with the slag of the acid Bessemer process, and subjecting the mixture to a reduction process, substantially as set forth.

3. The herein-described process of producing alloys of chrome, iron, and manganese, which consists in mixing the chromium ore, manganese ore, and the slag of the acid Bessemer process in finely-ground state with tar freed of water, and reducing the pasty mass in the form of briquettes in a blast or reverberatory furnace, substantially as set forth.

In testimony that I claim the foregoing as my invention I have signed my name in presence of two subscribing witnesses.

HEINRICH ECKARDT.

Witnesses:
  FRITZ MOELLENHOFF,
  HERMAN KUHFUS.